INVENTOR

BY Paul J. Reising

Barnard, McGlynn & Reising
ATTORNEYS

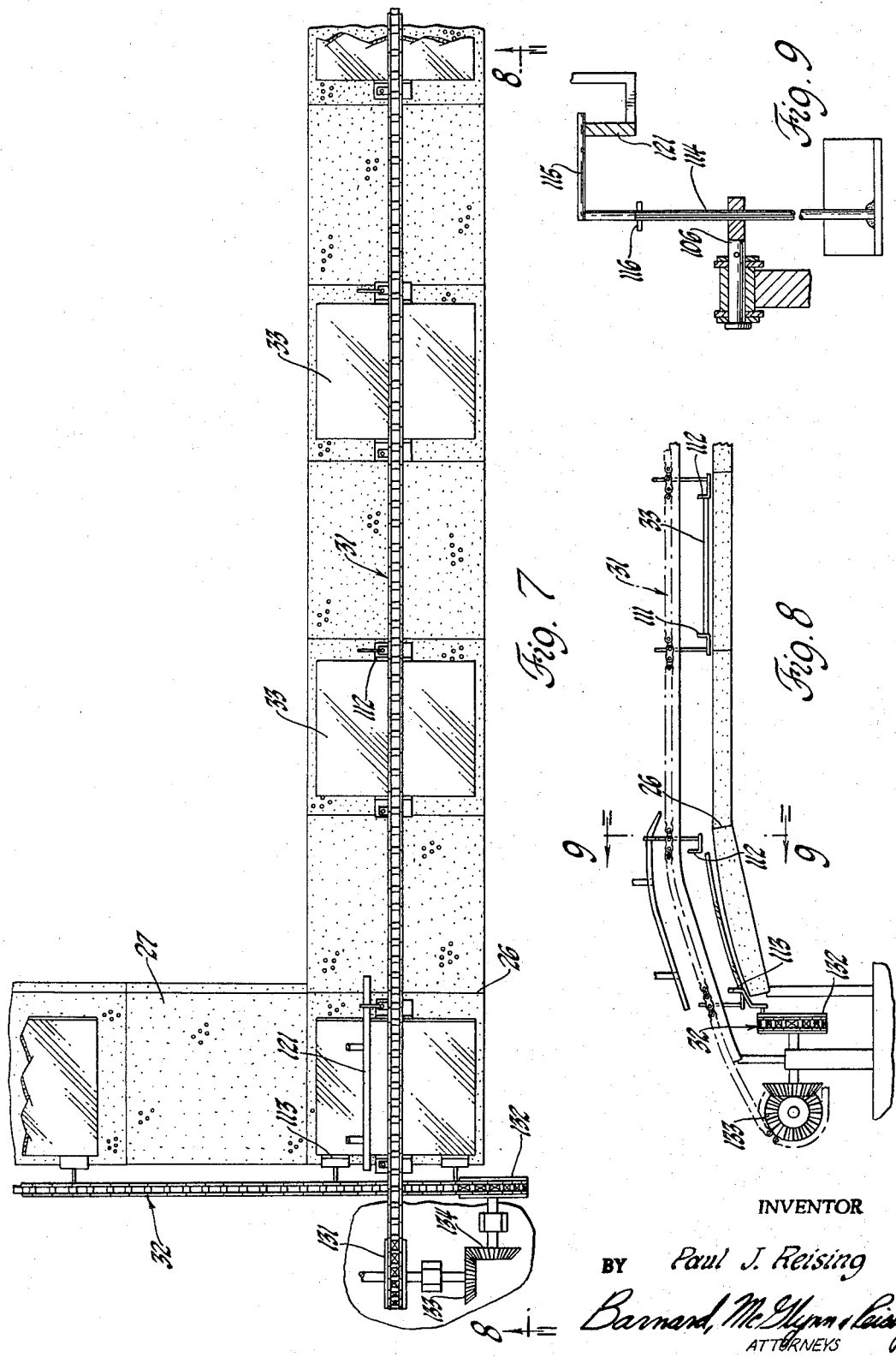

INVENTOR
BY  Paul J. Reising
Barnard, McGlynn & Reising
ATTORNEYS

March 26, 1968 P. J. REISING 3,375,093
METHOD AND APPARATUS FOR CURVING GLASS SHEETS OR THE
LIKE ON A GAS SUPPORT BED
Filed Jan. 11, 1965 4 Sheets-Sheet 4

INVENTOR.
BY Paul J. Reising
Barnard, McGlynn & Reising
ATTORNEYS

United States Patent Office 3,375,093
Patented Mar. 26, 1968

3,375,093
METHOD AND APPARATUS FOR CURVING
GLASS SHEETS OR THE LIKE ON A GAS
SUPPORT BED
Paul J. Reising, Birmingham, Mich., assignor to Permaglass Inc., Woodville, Ohio, a corporation of Ohio
Filed Jan. 11, 1965, Ser. No. 424,531
11 Claims. (Cl. 65—25)

ABSTRACT OF THE DISCLOSURE

An apparatus for treating sheets of glass comprising a furnace with a flat bed portion disposed in the furnace and a curved bed portion disposed in the furnace and abutting the flat bed portion along at least a portion of one side thereof. The curved bed portion is curved in a direction generally away from the abutment between the flat and curved bed portions. The curved bed portion is elongated so that serially arranged spaced sheets of glass may be moved in a first direction over the flat bed portion and then over the curved bed portion while still moving in the first direction and thereafter moved in a second direction over and along the curved bed portion.

This invention relates to a method and apparatus for manufacturing curved sheets of thermoplastic material, and more particularly, curved tempered glass sheets for automobile windows and the like.

In recent years there has been a greatly increased demand for tempered cylindrically curved glass sheets for use as the side and back windows in automobiles, protective screens for television tubes, building windows and the like. It is an object of the present invention to provide a method and apparatus for manufacturing curved glass sheets of high quality and at low cost on a continuous high-production basis. More specifically, the present invention has as one of its objects the provision of a method and apparatus for manufacturing curved glass sheets wherein the individual sheets of glass are heated and allowed to bend to a curved configuration while the glass sheets are floated on a film of hot gas thereby to prevent marring contact of the glass with the apparatus while the glass sheets are in the softened condition.

Briefly, these objects are accomplished in accordance with the invention by an apparatus which comprises a bed having perforations therein through which hot gas is emitted, the bed having an elongated flat portion abutting at one end thereof with a bed portion which abuts and may extend at a right angle to the first bed portion and which has a curved upper surface. Hence, preferably the bed is L-shaped and has a continuous perforated uninterrupted surface, the surface on one leg of the L being flat and the surface of the other leg being curved about its longitudinal axis.

In operation, the glass sheets are transported or guided by conveyor means over the flat leg of the L in the direction of the longitudinal axis thereof and toward the curved leg, the glass sheets floating on the hot gases emitted from the bed and being heated thereby. By the time each sheet reaches the curved portion of the bed, it has been heated to its softening temperature and hence as it proceeds over the curved portion, the front edge thereof drops, the sheet thereby curving to conform with the bed. Hence, the curved sheet moves in a direction at right angles to its previous direction until it enters a blasthead where it is tempered or cooled.

Figure 1:
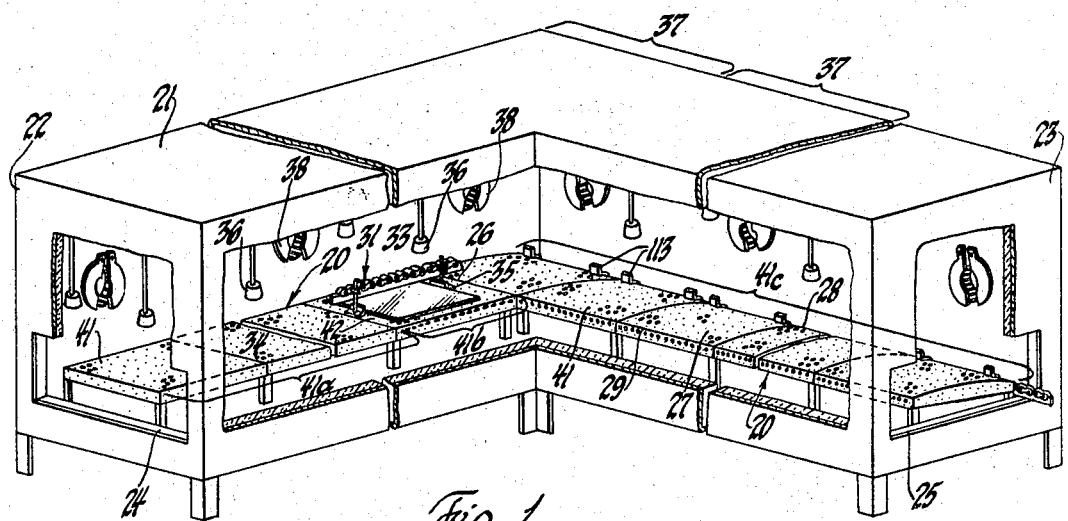
Figure 2:
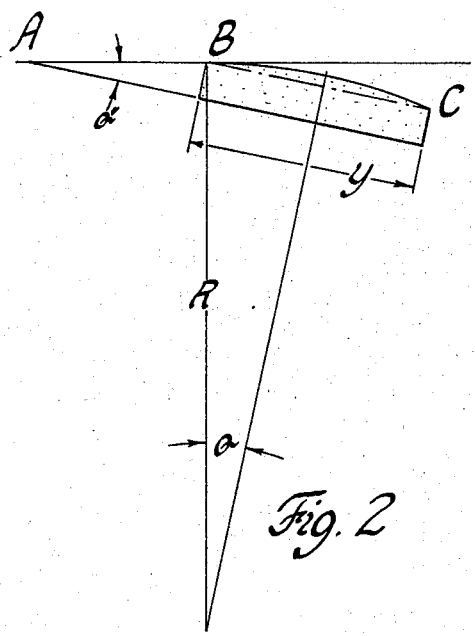
Figure 3:
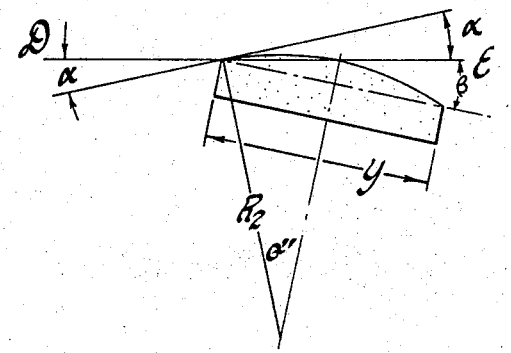
Figure 4:
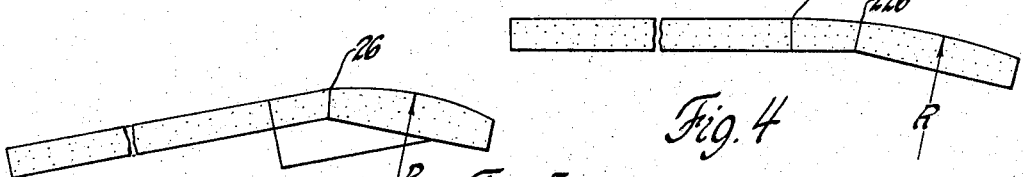
Figure 5:
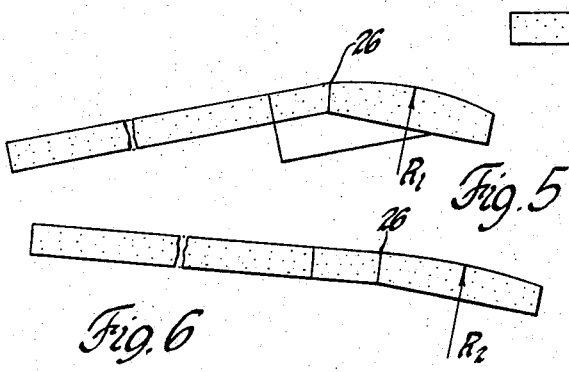
Figure 6:
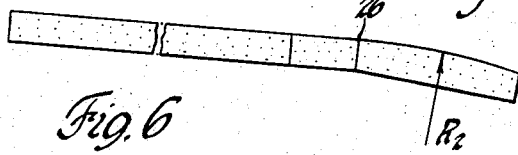
Figure 10:
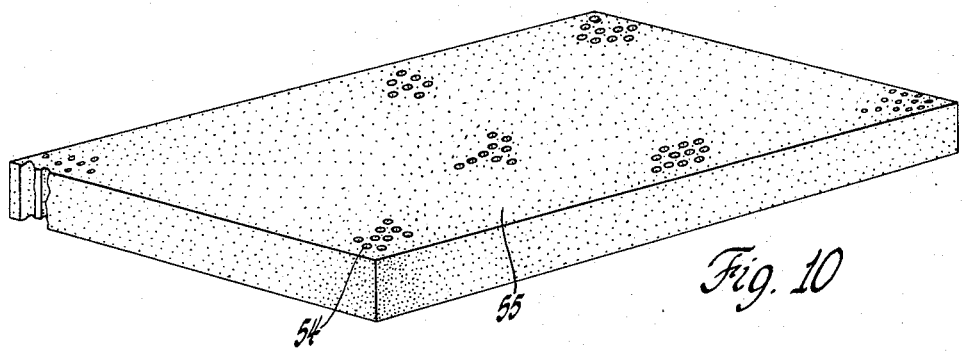
Figure 11:
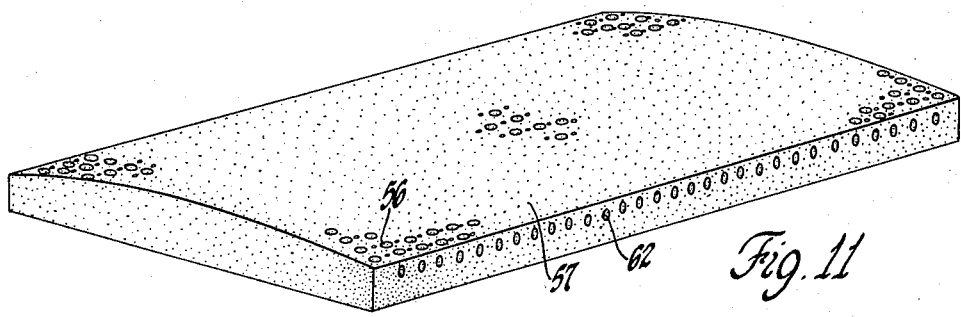
Figure 12:
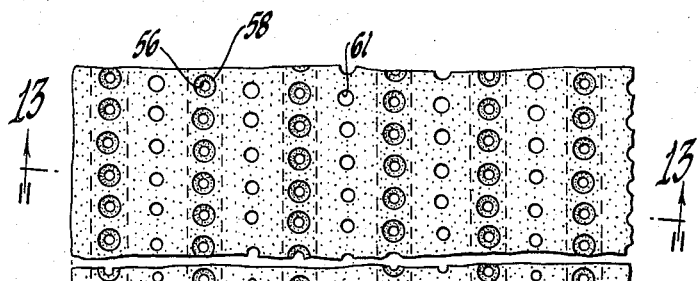
Figure 13:
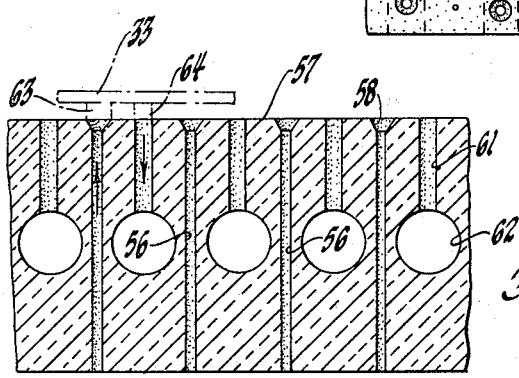
Figure 14:
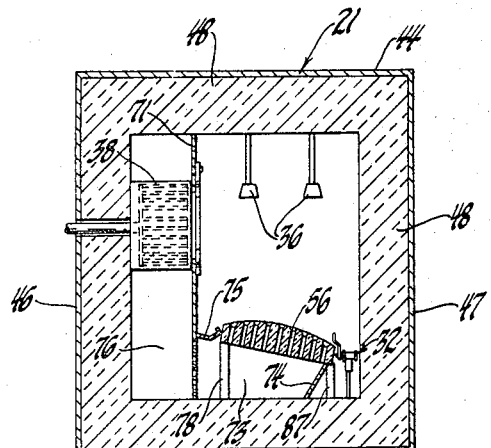
Figure 15:
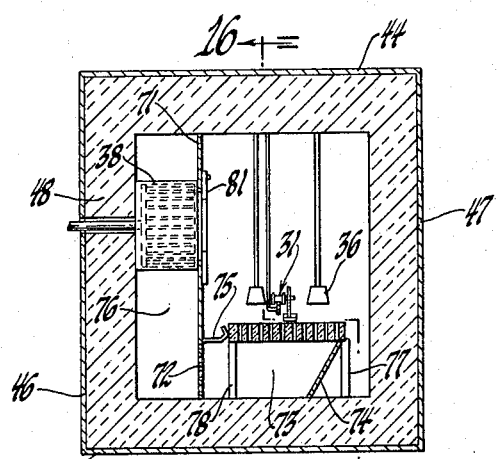
Figure 16:
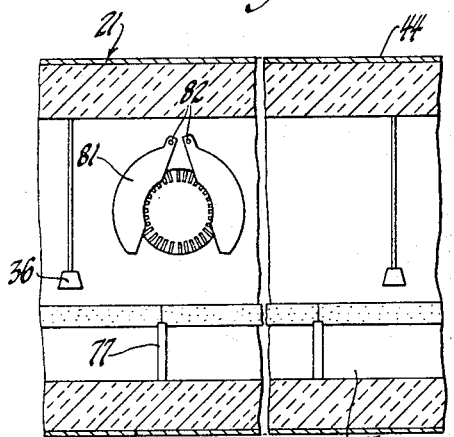
Figure 17:
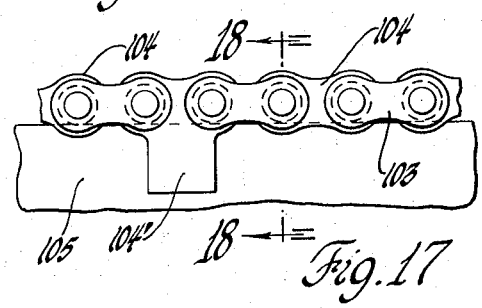
Figure 18:
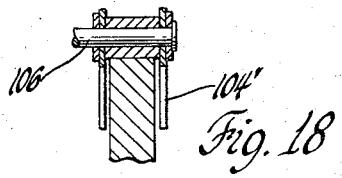
Figure 19:
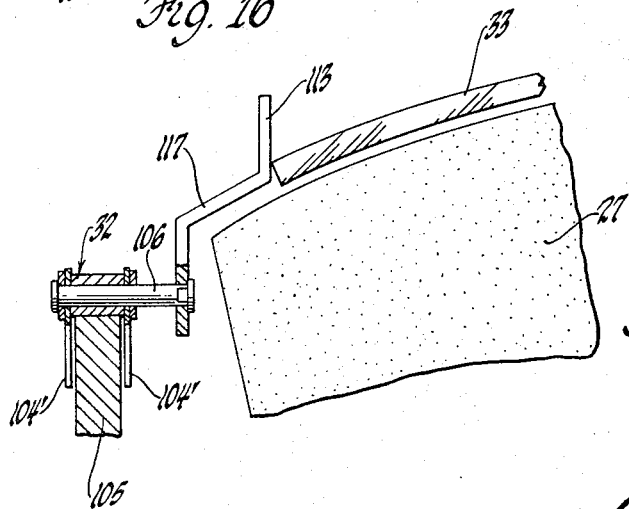

Other objects and many of the attendant advantages of this invention will be readily appreciated as the same becomes better understood by reference to the following detailed description when considered in connection with the accompanying drawings wherein:

FIGURE 1 shows a perspective view of an illustrative L-shaped furnace and bed of the instant invention;
FIGURE 2 shows a geometrical illustration of a possible relative disposition between the surfaces of the two legs of the L-shaped bed;
FIGURE 3 shows a geometrical illustration of another possible relative disposition between the surfaces of the two legs of the L-shaped bed;
FIGURE 4 shows an end view of an alterntive embodiment of the L-shaped bed;
FIGURE 5 shows an end view of an alternative L-shaped bed along one leg thereof;
FIGURE 6 shows an end view of another alternative L-shaped bed along one leg thereof;
FIGURE 7 is a plan view of the L-shaped bed of FIGURE 1;
FIGURE 8 is a partial plan view of the L-shaped bed taken along line 8—8 of FIGURE 7;
FIGURE 9 is an enlarged cross-sectional view of an illustrative conveyor utilized along the leg having the flat bed and taken along line 9—9 of FIGURE 8;
FIGURE 10 is a perspective view of a section of the L-shaped bed along the flat portion thereof;
FIGURE 11 is a perspective view of a section of the L-shaped bed along the curved portion thereof;
FIGURE 12 is an enlarged plan view of a portion of the surface of the bed section of FIGURE 11;
FIGURE 13 is an enlarged cross-sectional view of the section of the bed shown in FIGURE 12 taken along line 13—13;
FIGURE 14 is a cross-sectional view of the leg of the L-shaped furnace having the curved bed;
FIGURE 15 is a cross-sectional view of the leg of the L-shaped furnace having the flat bed;
FIGURE 16 is a cross-sectional view along the leg of the L-shaped furnace having the flat bed taken along the line 16—16 of FIGURE 15;
FIGURE 17 is an enlarged side view of an illustrative conveyor having a rail and a chain;
FIGURE 18 is a cross-sectional view of the illustrative conveyor taken along line 18—18 of FIGURE 17; and
FIGURE 19 is an enlarged cross-sectional view of an illustrative conveyor utilized along the leg having the curved bed.

Referring more particularly to FIGURE 1, the apparatus shown comprises an L-shaped perforated bed, illustrated generally by the numeral 20, and a furnace enclosure shown at 21 enclosing the bed. The furnace has end walls 22 and 23 which have the respective holes 24 and 25 extending therethrough. The aperture or the hole 24 in wall 22 of the furnace is to allow the bed 20 to extend therethrough so that the glass sheets may be loaded onto the bed at a loading station (not shown) outside of the furnace. The hole 25 in the wall 23 is to allow the bed 20 to extend from within the furnace to connect with a blasthead which will be attached to the furnace along wall 23 and which tempers the heated glass sheets. Examples of a blasthead and a loading station which may be attached adjacent to the walls 23 and 22 respectively are more particularly set forth in the Patent 3,332,759, in the names of Harold A. McMaster and Norman C. Nitschke.

The bed is flat from the loading section, not shown, adjacent wall 22, to the abutment 26 with the transverse leg 27. The transverse leg, i.e., the bottom of the L, or portion 27, which is at right angles to the flat portion of the bed, is curved in a direction transverse to the longitudinal axis thereof. The curved portion 27 has a uniform transverse curvature along its entire length and the curvature of the bed in the blasthead, which could be utilized adjacent to wall 23, would have a transverse curvature to conform to the curvature of transverse leg portion 27. Also, the curved bed portion 27 is tilted about its longitudinal axis at an angle to the horizontal, and, therefore, the left longitudinal edge 28 of the bed 27 is lower than the right edge 27. This tilt and is significance is more fully explained hereinafter.

Two conveyor systems are utilized, one is partially shown at 31 for moving a sheet of glass 33 along the flat portion of the bed to the transversely curved section 27. A second conveyor, generally shown at 32 in FIGURE 7, moves the sheet of glass along the transversely curved portion of the bed 27. The conveyors 31 and 32 serve to move glass sheets through the furnace and into a blasthead.

Also disclosed in FIGURE 1 are zones 37 in which are mounted burners 36 and blowers 38. The flat bed portion and the curved bed portion 27 have various holes and perforations therein and therethrough to allow the hot gases moved by the blowers 38 to move through the bed. This flotation process is described more particularly hereinafter. Briefly, then, without attention at this time to important features and details, the apparatus operates as follows: the glass sheets 33 are placed between the pads 34 and 35 on the loading section, which is adjacent to wall 22 of the furnace. The pads 34 and 35 are connected to the conveyor chain 31, and move the glass sheets 33 along the flat portion of the bed while the glass sheets remain out of contact with the bed by reason of the hot gas being emitted from the bed to create a blanket of gas for the sheets to float upon. The blower 38 in each zone 37 maintains hot gas pressure through holes in the bed, and the burners 36 maintain the circulating gases at the proper temperature thereby to heat the sheets of glass. The floating glass sheets are thus guided along the flat portion of the bed through the furnace where they are heated to deformation temperature by the hot gases being emitted from the perforations and as they reach the curved portion 27 of the bed at the abutment 26 between the flat and curved bed portions, the sheets sag under gravity to conform to the curvature of the bed section 27, all the while supported on gas and remaining out of contact with the bed. Hence, when the sheets 33 have contacted the conveyor 32, they are substantially shaped with the full curvature desired. Transportation of the floating, heated, curved glass sheets 33 continues along the bed portion 27 by the conveyor 32 to a blasthead, which could be connected to the furnace adjacent to the wall 23, where they are tempered by cooling air projected from bed perforations in the blasthead.

One of the more serious difficulties with apparatus of the general type described is that of thermal expansion of the bed with the furnace. Since it is generally undesirable to raise the temperature of the glass sheets too rapidly lest there be non-uniform heating with resultant damage to the glass and since a high rate of production is desired, it will be manifest that there are advantages to using a furnace of considerable length. The furnace operates at a temperature upwards of 1100° F. and as high as 1350° F., and different temperature zones 37 are maintained within the furnace, as will be hereinafter described. Initially and after any maintenance shut-down, the furnace must, of course, be taken from room temperature up to these operating temperatures and yet if there is uncompensated thermal expansion of the bed through its length, bed distortion will result and this in turn leads to non-uniform glass flotation, poor heat distribution, marring of the glass due to contact with the bed, inaccurate glass curvature, and other problems. Of course, one way to minimize the problem of glass contact with the bed is to float the glass rather high off the bed by using considerable gas pressure; however, this is inherently expensive in that higher pressures involve higher costs, and it also has the serious disadvantage of affording less control over the precise shape imparted to the glass sheets. As will be described hereinafter, in the preferred system of the present invention the glass sheets float at an extremely low stable level over the bed, particularly just prior to and while the glass is curved, and this makes it all the more essential that there be no distortion in the bed as can result from thermal expansion.

In accordance with the invention, the entire bed is formed of material having an extremely low coefficient of thermal expansion not more than $1 \times 10^{-6}/°C$., as well as excellent heat shock resistance, sufficient that the bed when at a temperature as high as about 1350° F. can be exposed to room temperature air without damage to the bed. More specifically, the bed in the furnace 20 is formed of fused quartz blocks 41, each of which has a width equal to the width of the bed and a length of about 30 inches. Hence, the entire bed comprises quartz blocks 41 axially aligned and in abutting relationship and preferably with a smooth powdered fused quartz caulking filling any crevices therebetween to seal and cement the blocks together. The blocks are manufactured by casting and then firing to sintering temperature granular fused quartz preferably of variated grain size. That is, quartz powder having a grain size of 325 mesh and finer is admixed with water to form a slurry and into this can be mixed granular quartz of varying size, from 200 mesh up to ⅛ inch, such mixture then being cast to the shape desired in a porous plaster mold or the like. After drying, the cast blocks are then fired to about 2000° F. to cause sintering, as is well known in the art. Preferably, the blocks are cast with the overall curved or other surface configuration desired and with at least the larger of the gas passages therein and, after firing, are machined to their precise final shape. Such blocks have a low coefficient of thermal expansion, about $.54 \times 10^{-6}''/°C$. Furthermore, the fused, quartz bed has extremely high heat resistance, erosion resistance, low heat conductivity, low heat capacity, and heat shock resistance and therefore lasts indefinitely with practically no maintenance. Because of its superb shock resistance, there is no danger of breakage in the bed even though when a temperature of 1350° F. or so it is exposed to room temperature air, for example, in the case of an emergency furnace shut down. Because glass does not adhere strongly to the quartz, if softened glass should contact it and become hardened thereon, as in the case of a blower or power system failure or the like, it can be quite easily removed. As a still further advantage, the quartz bed is quite inexpensive to manufacture and install. While fused quartz ceramic as described is outstandingly superior it will be understood that other materials can be used for the bed. For example, nucleated glasses such as Pyroceram marketed by the Corning Glass Company, Masrock marketed by the Glassrock Products Inc. and various high alumina and/or high mullite ceramics known to have good thermal resistance and low coefficients of thermal expansion as well as good heat and errosion resistance can be used if desired, though not to the same advantage as fused quartz.

The bed sections which extend into the loading portion through the wall 22 of the furnace may be made of aluminum or wood or plastic board or the like. The use of ceramic for the bed in the loading section has no advantage and, in fact, it is disadvantageous because of the cost as compared with sheet aluminum and also because of the greater possibility of injury to the glass during the loading operation. Likewise, the bed section in the blasthead may be made of aluminum. However, for some embodiments it will be advantageous to use a bed material in the blasthead the same as that described for use in the furnace for two important reasons. First, because fused quartz, or other ceramic, has very low heat conductivity as compared with aluminum or other metal, there is little possibility of chill cracks developing in the glass sheets by reason of contact of the glass with the blasthead bed. With the threat of such glass damage eliminated, there is less need for absolute assurance against glass contact with the blasthead bed thus simplifying blasthead design. Secondly, the excellent heat shock resistance of the ceramic assures against bed damage in the case of hot and then cold gas impinging on the blasthead in rapid succession, as can occur in that portion of the blasthead adjacent the furnace. Further, the dimensional stability of the ceramic through a wide temperature range, from room temperature to well above 1350° F., assures maintenance of a perfect alignment between the bed surface in the furnace and that in the blasthead thereby better assuring against contact of the glass with the bed. Using a fused quartz bed in the furnace and the blasthead it is possible and in fact advantageous to have a single bed block span the line of separation between the furnace and the blasthead thereby absolutely assuring perfect bed alignment at this point. The high thermal shock resistance of the ceramic allows this without hazard of injury to the material by reason of the great temperature differential between the furnace and the blasthead.

As indicated above, the quartz bed, albeit it has an extremely low coefficient of expansion, does expand very slightly on its respective longitudinal axes when heated to operating temperature. At the same time, however, the metal support structure of the furnace expands considerably when the furnace 21 is heated to operating temperature. Though it forms no part of the instant invention, it is appropriate to mention that in the embodiment shown compensation is made for this by supporting the bed on a support structure which is independent of the furnace whereby the furnace can expand without stressing the bed, the bed support being so constructed and positioned that its thermal expansion, in its temperature environment, is quite low and about that of the bed when the latter is heated to operating temperature. Such support structure is disclosed and covered in United States Patent 3,281,229 in the name of Harold A. McMaster and assigned to the assignee of the present invention.

In the embodiment of the invention shown in the accompanying drawings and described in detail herein, the glass sheets are treated to form curved glass sheets typical of what might be used in automobile side windows or the like. Under such conditions it is, of course, necessary that the bed be curved at some point to the desired glass contour. For proper treatment of the glass sheets, the bed contour should not change to the desired curvature before the glass sheet is raised to deformation temperature. Hence, it is that the bed has a leg which has a flat upper surface over most of its length, i.e., from the loading section to the curved portion 27, in order to provide sufficient time for the glass sheets to reach deformation temperautre. When the sheets of glass have reached deformation temperature, they move over the abutment or junction 26 and over the curved portion 27 of the bed. At the abutment 26 of the flat portion of the bed with the curved portion 27, the bed surface contour changes from flat to curved. The contour of the bed portion 27 is such as to provide the curvature desired in the glass sheets.

Referring again to the structure of the support bed, it will be noted from the various figures of the drawings that the bed sections are provided with a plurality of holes or perforations of varying patterns, size and location. The perforations permit the flow of gases through the bed to provide optimum support and heating of the glass sheets as they pass thereover. Along the major portion of the length of the flat portion of the bed there are only gas inlet passages extending through the various bed sections 41. Just prior to the abutment 26 of the flat portion of the bed with the curved portion 27, where the glass has reached its deformation temperature, both inlet and exhaust passages are provided. The size, number and location of the passages permits the use of a low pressure flow system of recirculation gases to float the glass sheet over the bed and through the furnace.

In the flat portion of the support bed at the first part of the furnace, that is, from the wall 22, or the loading section, to the seam 42 between adjacent blocks 41, the bed section 41a may be formed generally of rectangular flat blocks approximately 30 inches long and of the desired width. Each of these blocks is provided with a plurality of perforations to permit gas flow upwardly therethrough. FIGURE 10 is a perspective view of a typical bed block in the section 41a of the furnace and illustrates the perforations 54 formed therethrough. It has been found that for optimum flotation of the glass sheets over this section of the bed, the perforations preferably be about ⅛ inch diameters and spaced one-half inch apart laterally of the bed and three-quarters of an inch apart longitudinally of the bed. The perforations in adjacent transverse rows are staggered longitudinally such that every fifth row repeats the pattern and the ⅛ inch stripe of impact of gas from each perforation onto the glass sheets moving thereover slightly overlaps the strips from longitudinally slightly offset neighboring perforations to afford uniform support and heating.

The hot combustion product gases circulated by the blowers 38 pass up through the perforations 54 to the top surface 55 of each section. With the glass sheet 33 disposed above the upper surface 55 and with the gases flowing through the perforations 54, a blanket of such gases will form over the surface 55 and on which the glass sheets 33 will float and become heated. The gases are permitted to flow across the surface 55, that is, between the surface 55 and the glass sheet 33, and out from underneath the glass sheets 30 at the edges thereof. The hot gases continue to circulate by means of the blowers 38 through the portion of the furnace containing the burners 36 and against the underside of the bed section 41a. The flow rate of the gases caused by the blower 38 and the size of the apertures 54 are such as to provide a suitable volume of gas between the glass sheet 33 and the upper surface 55 to float the glass sheet thereover. Such volume of gas is at a relatively low pressure; it has been found that pressures in the neighborhood of one inch to two inches of water column pressure in the plenum below the bed in this portion of the furnace is sufficient. The average pressure between the glass and the bed is equal to the weight of the glass per unit of surface which in the case of ¼ inch thick glass is ⅝ inch water column pressure. It has been found that a flow rate of approximately 7000 cubic feet per minute per 25 square feet of bed is ample. With the proper amount of gas flow to generate the proper pressure, the glass sheets 33 will float across the flat surface of the bed section 41a at a distance of somewhere between .04 inch and .25 inch in this section of the furnace. This relatively high float in this portion of the furnace where the glass is rigid is advantageous in that it reduces the possibility of glass contact with the bed. Also, when the cold glass sheets first enter into the furnace there is likely to be a certain amount of warpage thereby increasing the possibilities of glass contact with the bed, which possibilities are reduced by using a higher float. Hence, extremely accurate control of the bed surface is not essential in this portion of the furnace. At the edges of the glass sheets the pressure is substantially zero and it will be obvious, therefore, that once the glass sheets approach or reach deformation temperature this system of support would not be feasible and hence another configuration is used, such configuration to be described forthwith.

The hot gases emitted through the perforations 54 heat the glass sheets up to deformation temperature by the time the sheets reach bed section 41b. In the section of the furnace including sections 41b and 41c, that is, the last part of the flat portion and all those portions where the contour of the support bed 27 is curved, the ceramic blocks 41 take on a perforation pattern such as is best illustrated in FIGURES 11 through 13. FIGURE 11 shows a curved block which is utilized in the curved bed portion 27, but has the same perforation pattern as the blocks in section 41b. In these sections of the furnace, the blocks are provided with both inlet and exhaust perforations or apertures in a desired pattern. The inlet perforations 56 differ in these zones of the bed in that the upper portions adjacent the top surface 57 of the blocks 41b and 41c are enlarged, as at 58, in a manner similar to countersinking. It should be understood that the perforation pattern for bed sections 41b and 41c are the same; however, the upper surface of section 41c of bed portion 27 is curved rather than flat as is surface 57 of section 41b. The inlet perforations 56 are arranged in spaced transverse rows, as rows 59 and 60 in FIGURE 12, and disposed between the rows are alternate rows of exhaust perforations 64. Exhaust perforations 61, as best illustrated in FIGURE 13, extend partially through the blocks of sections 41b and 41c and communicate with transverse passages 62 extending through the respective blocks from side to side. Such passages 62 open through the side of each block of sections 41b and 41c and thus permit the exhaust gases to be exhausted directly into the furnace for recirculation. The aggregate of the perimeters of the inlet perforations in the plane of the bed surface is greater than the aggregate of the perimeters of the outlet perforations in the same plane such that when a sheet of glass is positioned in close spaced parallel relationship to the bed surface, the aggregate of the areas of imaginary walls extending from the outlet orifices to the plane of the glass is less than the aggregate areas of imaginary walls extending from the inlet perforations to the plane of the glass. The outlets function, therefore, to provide restrictive orifices for the gas flow and create a positive pressure sufficient to suport the glass. Hence, where the exhaust and inlet perforations are all round and where the number of exhaust openings is about equal to the inlet openings, as in the embodiment shown, the diameter of the exhaust perforations is smaller than that of the inlet perforations.

It is important to note in FIGURE 12, therefore, that the diameter and therefore the perimeter of the exhaust perforations 61 is smaller than that of the enlarged upper end of the inlet perforations 58. With a glass sheet 33 spaced from the surface 57 of the section 41b, there is formed annular orifice 63 about the inlet perforations 58 which is larger than annular orifice 64 formed between the glass sheet and the outlet or exhaust perforations 61. Since the inlet orifice 62 is larger than the exhaust orifice 63 by reason of the larger perimeter of the inlet orifice, there will be a positive pressure above the surface 57 sufficient to maintain the glass sheet 33 on the blanket of gas thus produced. In effect, then, there is substantially continuous gas blanket support for the glass sheets, the only voids in the gas blanket support being directly over the exhaust perforations. Summarizing the system is functionally one wherein the gas support blanket is provided by restrictive exhaust perforations which create a back pressure which increases rapidly as the glass sheet settles toward or approaches the bed and the area of the annular orifice 64 decreases until the glass sheet reaches an equilibrium level above the bed. The inlet perforations serve merely to supply low pressure gas to the constantly recirculating gas blanket. As the distance between the glass sheet and the bed increases, the back pressure around the outlet perforations decreases not only because of the resulting increase in the size of the orifices at the outlets, as described, but also because the inlet passages at their smallest diameter (i.e., below the flared upper ends) are smaller than the outlet passages thereby restricting the supply of low pressure gas from the plenum below the bed to the surface of the bed.

Measurements show that the pressure in the enlarged generally conically shaped upper extremities of the inlet passages is not substantially less than the pressure in the plenum chamber below the bed. The plenum chamber pressure in this zone of the furnace wherein both inlets and exhaust are used may be on the order of 1.8 to 2.5 inches water column pressure. The pressure of the gas support blanket between the bed and the glass sheet immediately over the inlet perforations is about equal to the plenum chamber pressure and tapers off toward the exhaust orifices, the pressure directly over the exhaust orifices being zero. However, there is a positive pressure over substantially the entire surface of the bed, except directly over the exhaust perforations, sufficient to support the glass sheet at its equilibrium level as before described. Since the gases can circulate from the inlet perforations to nearby outlet perforations there is a relatively uniform average pressure through the central areas of the glass up to a narrow, about one-half inch, margin area adjacent to the edges of the glass from which area the gases can escape about the edges of the glass. To compensate for this, the exhaust perforations 61 decrease in size from the center of the sections 41b and 41c to the edges thereof, as can be seen in FIGURE 11. This particular feature of the exhaust perforation pattern is more clearly described and is claimed in United States Patent 3,332,760 in the names of Harold A. McMaster and Arthur F. Van Zee and assigned to the assignee of the present invention.

Because the gas feed from the inlets need only be and is at low pressure, there is little or no tendency of the hot gases being fed to cause localized distortions in the glass as is the case where high pressure jets impinge against the bottom glass surface.

Since heated gases are entering through the perforations 56, it would not be desirable to have a continual axial row of inlet perforations since this would produce an axial or longitudinal stripe of hot gases against the under surface of the glass sheet 33. To avoid this problem, each inlet passage 56 in the longitudinal direction is offset slightly from the preceding inlet passage 56. A suitable spacing has been discovered to be a repeat of every fifth row of inlet passages and to equally displace the succeeding perforations therebetween. In this manner, the entire surface of the glass sheet 33 will be properly heated without localizing or aligning heated sections thereof. The outlet perforations are likewise staggered, in the direction generally longitudinally of the bed, each fifth row repeating.

The flow rate and the spacing and pattern of the perforations in the blocks of sections 41b and 41c are such as to make the glass sheet 33 float at a closer distance to the support bed than during the earlier flat section 41a. The inlet perforations in blocks of sections 41b and 41c have a diameter of one-eighth inch flaring outwardly to about three-eighths inch at the top surface of the bed. The depth of the flare is not critical but may be approximately one-quarter of an inch. The inlet passages below the flared upper ends are small in comparison to the outlet passages for the reason alluded to previously. The largest of the exhaust perforations are slightly less than one-quarter inch in diameter. Both the inlet and exhaust perforations may be one and one-half inches apart longitudinally and one-half inch apart laterally. Further, as previously mentioned, the outlet perforations may decrease in size from the center of the block section laterally to the edges, the perforations at the edge being one-eighth inch in diameter and those between the center and the edge being three-sixteenths inch in diameter.

It has been found desirable to provide a flow rate of approximately 7000 cubic feet per minute per 20 square feet of bed area and a gas pressure of somewhat in the neighborhood of 1.8 to 2.5 inches of water pressure in the plenum chamber below the bed. Under such conditions, the glass sheets 33 will float lower or closer to the support bed than in the flat portion comprising blocks making up section 41a, and at a distance of about .005 to .020 inch. Under such conditions the glass sheets more readily conform to the contour of the surface 57 of the bed section 41c.

In between the high float section 41a and the low float sections 41b and 41c there may be provided a float transition zone. Such transition zone brings the glass sheets 33 from the high float condition to the low float condition in a smooth and gradual manner. The transition zone accomplishes this by means of a gradual increase in the number of exhaust perforations per unit of bed length, from none in the blocks of section 41a to a full complement of exhausts in the blocks of sections 41b and 41c. This is more clearly described and shown in United States Patent 3,332,760 in the names of Harold A. McMaster and Arthur F. Van Zee and assigned to the assignee of the present application.

From the foregoing it is apparent that the flotation of the glass sheets 33 over the support bed is accomplished by means of a flow system resulting from the circulation of hot combustion gases from the furnace through a suitable blower assembly and through the support bed. Although the foregoing has been described with reference to a block section having a plurality of inlet perforations formed therethrough, this function may be accomplished in some other suitable manner. For example, it is possible to provide a porous ceramic block section which will permit free flow of gases therethrough. Such would be sufficient to support the glass sheets on the desired blanket of gases provided, of course, that the flow rate is proper. In order to provide exhaust outlets, the same type of porous block section may be used and a series of non-porous pipes or tubes may be inserted or formed in the block section to communicate with the upper surface of the bed and lead to the desired exhaust passages or to otherwise exhaust the gases from the surface of the block section. Hence, the exhaust outlets by reason of their number and restricted size provide the required back pressure to form the gas support blanket, the gases being fed through the pores of the blocks serving to feed relatively low pressure gas at a support rate to maintain the blanket. Tubular inserts may be easily placed in the block sections as they are originally molded, the inserts being of suitable size and shape to properly convey the exhaust gases from between the glass sheet 33 and the bed. The tubular inserts, which constitute the exhaust perforations, can, if desired, extend slightly above the plane of the remainder of the bed, the upper extremities of the exhaust tubes being in a common plane or other surface which, in effect, constitutes the plane or surface desired of the bed to provide the shape desired to the glass sheets. Other configurations will be apparent to those having skill in the art after having had reference to the specification and drawings of the present invention.

*Heating system*

As has now become apparent, the method and apparatus described and shown herein makes use of an L-shaped furnace which in the embodiment shown is of generally box-like construction as viewed in cross-section. The furnace walls and support structure can be of any design well known in the art. It is, of course, desirable that the furnace be fully insulated and that the structural parts of the furnace be subjected to as little heat as possible to avoid expansion and contraction problems as the furnace is raised to the desired temperature. To this end, as shown in FIGURES 14, 15 and 16, the furnace 21 may be constructed with top and bottom walls 44 and 45 and opposite side walls 46 and 47 having insulating material 48 disposed on the inner surfaces thereof.

In order to provide heat within the furnace 21, a plurality of burners 36 are provided, in varying numbers and varying distances from the bed, for a purpose to become hereinafter more apparent. The burners 36 may be of any suitable type sufficient to provide the proper amount of heat and to operate on a convenient fuel, such as a gas and air mixture. The burners 36 receive the fuel and air mixture through a conventional piping system, not shown. Radiant burners which burn at a temperature of about 2000° F. and which are well known in the glass processing furnace art are preferred.

As has been previously alluded to, the embodiment of the furnace shown is divided into two zones 37. In the zones along the flat portion of the bed, as shown in FIGURES 15 and 16, the burners 36 depend from the ceiling of the furnace toward the bed. The number and location of the burners along the flat portion is such as to raise the temperature in the furnace 21 to a temperature of from 1200° F. to 1350° F., depending, of course, upon the type of operation to be carried out in the furnace. From what has thus far been stated it should be clear that for optimum operation of the apparatus it is important that the glass sheets float uniformly out of contact with the bed and, where the glass sheets are to be curved as in the embodiment shown, that nothing interfere with the sagging of the heat softened sheets by gravity so as to conform to the bed curvature. To the end of accomplishing such optimum performance it has been found highly desirable to provide means in the furnace for accelerating the heating of the top surfaces of the glass sheets, at least prior to that zone in the furnace where the curvature begins, i.e., at abutment 26. Hence, as can be seen in FIGURES 14 and 15, the burners 36 over the flat portion of the bed are spaced more closely to the support bed than are the burners in the curved portion 27 of the furnace. Such burners, i.e., the burners over the flat portion of the bed, by reason of their lowered position cause the hot combustion gases to actually play against the upper surfaces of the glass sheets thereby serving as the means to accelerate the heating of such surfaces. If desired, only those burners near the abutment 26 (i.e. the portion of the flat bed immediately preceding that wherein the curvature begins) can be lowered, those above the first part of the flat section of the bed being positioned higher; however, this will not serve to equal advantage for reasons which will be apparent from the following. If a glass sheet is heated more rapidly on one side than the other warpage inherently results. This is because glass is a poor heat conductor, considerable time being required for the heat imparted to one side to be transferred through the glass to the other side. Further, it will be clear from the foregoing description that in the apparatus shown, the flotation system for the glass sheets inherently and intentionally results in a relatively rapid heating of the bottom surfaces of the glass sheets, the flotation gases emitted from the bed being hot. In the absence of any means for heating the top surfaces of the glass sheets at a commensurate rate, warpage will generally result and such warpage can and does occur about the longitudinal axis of the bed, the side edges of the sheet being high and the middle low. If such warpage is not corrected at least by the time the sheet reaches the zone where bed curvature commences, it can seriously interfere not only with the gravity sagging of the sheet into conformity with the bed but also with flotation. This is because the axis of warpage curvature is at right angles to the axis of bed portion 27 curvature and hence even though the sheet is at deformation temperature, it cannot freely sag to the curved contour of the bed. And not being able to conform to the bed, uneven spacing between the sheet and the curved bed results across the surface of the sheet thereby disrupting proper flotation and greatly increasing the possibility of glass contact with the bed. Hence, it is that it is highly desirable at least prior to the curvature zone to accelerate the heating of the upper surface of the glass sheets such that by the time the sheets reach the curvature zone, there is substantially no temperature gradient through their thickness and hence no warpage to interfere with the proper sagging and flotation. Of course, ideally warpage should be prevented or at least inhibited from the outset, throughout the furnace, and it is for this reason that lowered burners are used over the entire flat portion of the bed rather than in just those zones immediately preceding that wherein bed curvature begins. It will be of interest to note, however, that if for any reason it is not desirable or convenient to use lowered burners or other means over the flat portion of the bed to accelerate heating of the upper surface of the glass sheets commensurate with the rate of heating of the bottom surfaces, the flotation system of the present invention is such that it permits this. That is, as was brought out hereinbefore, the float system is such that the sheets float relatively high in the early part of the flat portion of the bed and hence, even though the sheets be warped in these zones there is little, if any, likelihood of contact between the glass and the bed due to warpage so long as the warpage is sufficiently corrected before the sheets reach the bed curvature zone at abutment 26.

In effect then, the burners are lowered to increase the rate of heating of the upper surfaces of the glass sheets by radiation and by impingement of the hot combustion product gases to thereby balance the heating rate to that of the bottom surfaces which is accelerated due to the impingement of the hot flotation gases. It will be understood that means other than lowered burners can be used if desired to accomplish such end. For example, burners or other heating means can be located remote from the glass and by means of a blower or the like the hot gases therefrom directed as by nozzle against the upper surfaces of the glass sheets.

It has been previously stated that the heating system for the glass sheets is a circulating hot gas system, and the circulation both supports the glass sheets and assists in heating the glass sheets as they pass along the support bed. The system is more clearly illustrated in FIGURES 14, 15 and 16 wherein FIGURE 16 is a cross-sectional view taken along the longitudinal axis of the flat bed portion of the furnace, FIGURE 14 is a cross-sectional view taken transversely of the furnace along the curved bed portion, and FIGURE 15 is a cross-sectional view taken transversely of the furnace along the flat bed portion. A longitudinal vertical wall 71 having spaced large circular openings adjacent the upper end thereof extends the length of the L shape of the furnace, between the insulated side wall 46 and the bed. Between the wall 71 and the insulated side wall 46 are a series of blowers 38 at spaced points along the length of the furnace, each blower being positioned at one of the large openings in the wall 71. Preferably there should be at least one such blower for each of the zones 37 for optimum circulation of the gases within the furnace 21. Wall 71, which constitutes a baffle is provided with a series of apertures or perforations 72 at the lower portion thereof, the perforations being below the level of the support bed. With the blowers 38 operating and the gases in the furnace 21 above the bed being brought up to temperature by the burners 36, the gases will be circulated by the blowers 38 through the space between wall 71 and the insulated side wall 46 and blown through the perforations or apertures 72 in the baffle wall 71. The gases then flow into the plenum 73 underneath the bed and up through the perforations 54 and 56 in the support bed to float and heat the glass sheets. Suitable baffle means 74 are located adjacent and below the front edge of support bed to direct the flow of gases through perforations in the support bed. A second baffle 75 between the vertical wall 71 and the bed prevents the flow of gases past the bed. Vertical generally L shaped baffle plates 76 extending transverse of the furnace are spaced to separate the heat zones 37. Such baffle plates have an upper leg which extends from the top to the bottom of the blower chamber, i.e., the space between wall 71 and the insulated side wall 46, and a bottom leg which extends laterally from the bottom perforated portion of wall 75 to the baffle 74, and vertically downward from the insulated bottom wall 45 to the underside of the bed which is supported by rows of spaced posts 77 and 78. Hence, the furnace shown has a blower at the middle of each of the zones 37 and the vertical baffles 76 separate the zones 37. The blowers are made of a high heat resistant metal sufficient to withstand upwards of 1500° F. and the electric motor drive means (not shown) for the blowers are located outside the furnace out of the high heat.

In operation, the blowers pull hot gases from the upper part of the furnace, and route these gases to the plenum 73 underneath the bed from whence they are forced by the pressure from the blower up through perforations in the bed, thereby floating and heating the glass sheets. Then the gases circulate to the upper part of the furnace for recirculation as described.

It will be apparent from the foregoing that the glass sheets passing along the support bed will be heated by heat from the burners 36 as well as by the gases circulated by the blowers 38 through the support bed. Since these gases also supply the flotation and support for the glass sheets, it is important that regulation means be provided for the blowers 38 to regulate the flow rate and thus the proper flotation of the glass sheets over the bed. For these purposes, suitable shutters or doors 81 and 82 may be provided for each blower. The shutters 81 and 82 are pivotally secured as at 82 to the wall 71 or any other suitable structure and are of semi-circular shape, as best illustrated in FIGURE 16. The shutters are operable to partially close off the opening in the wall 71 leading to the blower 38 to regulate the flow rate therethrough. Suitable control means, not shown, are provided to control the position of the shutters and hence the size of the opening leading from the upper part of the furnace, wherein the heating means is located, to the blowers.

For otherwise regulating the heat and circulation in the furnace 21, convenient and suitable instrumentation may be provided and suitable controls or regulators conveniently mounted and operable to control the heat generated by the burners 36 and the circulation of gases through the blowers 38. Further amplification of blower regulation and an example of specific blowers which may be used in the instant invention is contained in United States patent application Ser. No. 395,826 filed Sept 11, 1964, in the names of Harold A. McMaster and Norman C. Nitschke and assigned to the assignee of the present invention and now abandoned.

Bed configuration

FIGURES 2 through 7 more particularly set forth the overall configuration of the L-shaped bed. There is shown in FIGURE 7 a plan view of the L-shaped bed with the flat portion ending at its abutment 26 with the curved portion 27, which is the leg of the L. As was alluded to previously, the curved portion 27 of the bed is tilted at an angle. It is advantageous to tilt the curved portion 27 so that the sheets of glass 33 when curved have a component of force, due to their weight acting against the conveying means 33 along the curved portion of the bed so that there will be frictional contact between the sheets 33 and the conveying means sufficient to move the glass sheets along the curved portion but not great enough to injure the edges of the glass sheets. It has been found most advantageous to establish the angle of tilt of the curved section 27 of the bed between angles of approximately three to twelve degrees. An angle of tilt of five degrees for the curved portion of the bed creates sufficient force to urge the glass sheets against the conveying means to move the heated sheets along the curved portion of the bed without any possibility of injuring the sheets by causing optical distortion or deforming the edges thereof. Likewise, it has been found that with the tilt angle of approximately twelve degrees, or more, the weight of the glass acting against the conveying means is sufficient to deform and injure the edges of the glass sheets bearing against the conveying means 32. Of course, one important consideration in the determination of the angle of tilt of the curved portion of the bed is the degree of transverse curvature of the bed; in other words, the length of the radius which evolves the curvature along the curved portion 27 of the bed. The shorter radius of the arc of the transverse curvature of the bed portion 27 the greater the component of force due to weight urging the sheet against the conveying means 32, and, therefore, frequently the number of degrees of tilt of the bed must be decreased as the degree of transverse curvature increases to prevent optical distortions and/or deformation of the edges of the glass sheets. That is to say, the greater the degree of curvature of the curved portion of the bed, the less the bed can be tilted.

Therefore, as is shown in FIGURE 2, it can be determined by elementary geometry the desired angle of tilt for any particular cylindrically curved bed having a particular radius when the curvature of the curved bed portion is tangent to the flat bed portion at the abutment therebetween. The AB line in FIGURE 2 represents the flat portion of the bed and in the embodiment illustrated is tangent at point B with the curved line BC, which represents the curved surface of the bed portion 27. The radius R is perpendicular to line AB at point B and defines the angle $\theta$ with the center line of the curved bed portion. Y is the width of a block in the curved portion of the bed; therefore, for a particular radius of curvature desired in a sheet of glass, the angle $\theta$ may be determined since the sine of $\theta$ equals one-half of Y divided by the radius. It is to be noted that $\theta$ is equal to $\theta'$ which is the tilt angle with respect to a horizontal plane of the curved portion 27 of the bed. Therefore, if the tilt angle of the bed is limited at twelve degrees, angle $\theta$ is also limited to twelve degrees.

However, as is illustrated in FIGURES 3 and 6, a higher degree of curvature, i.e., one having a shorter radius, may be obtained by positioning the flat portion of the bed with its longitudinal axis at an angle with a horizontal plane represented by line DE in FIGURE 3. Such an angle is represented in FIGURE 3 by the angle $\alpha$. The angle $\beta$ in FIGURE 3 is the angle of tilt of the curved portion of the bed. Y is the width of the blocks comprising the curved portion of the bed and $R_2$ is the radius of curvature. Again, as can be shown by simple geometry, since the lines forming the angle $\theta''$ are perpendicular to the two lines forming the angle $\alpha$ plus $\beta$, angle $\theta''$ equals the sum of the angles $\alpha$ and $\beta$. As alluded to previously, the angle of tilt, such as angle $\alpha$ in FIGURE 3, is limited by the magnitude of the force urging a sheet of glass against the conveyor without causing optical distortions or wrinkling of the edges of the respective sheets of glass. Once the maximum angle is determined both angle $\alpha$ and angle $\beta$ must not be greater than that maximum angle, since a conveyor would be pushing the sheets up the flat bed portion as shown in FIGURE 3 and optical distortions or wrinkling could occur adjacent the trailing edge of such a sheet of glass. As is apparent from FIGURE 3 when the maximum degree of transverse curvature is utilized in a situation where the flat bed portion is tangent to the curved bed portion at the abutment therebetween, angle $\beta$, the tilt angle, will equal angle $\alpha$, the angle the flat bed portion forms with a horizontal plane. In this situation both angle $\alpha$ and angle $\beta$ are of the maximum number of degrees allowable to move glass along the bed without causing optical distortions or wrinkling the edges thereof. To determine angles $\alpha$ and $\beta$ it is best to assume the flat bed portion and the curved bed portion will be disposed so that they have equal angles of tilt, i.e., angle $\alpha$ equals angle $\beta$. Of course, if the degree of transverse curvature desired is such that angle $\theta''$ is small enough so that one-half angle $\theta''$ is not the maximum possible angle of tilt then the relative dispositions of the flat and curved bed portions may be changed so that angle $\beta$ is decreased as angle $\alpha$ is increased, or vice versa. For example, with the flat bed portion tangent to the curved bed portion, angle $\beta$, the tilt angle, may be decreased, which results in an increase in angle $\alpha$, until angle $\alpha$ reaches the number of degrees permissible without causing optical distortion or wrinkling of the respective glass sheets as they move over the flat bed portion.

The same procedure may be utilized to determine the angle of tilt of the curved bed portion when the latter is not tangent to the flat portion at the abutment therebetween. The tilt angle could be determined for a curved bed having a particular degree of curvature which is tangent to the flat bed and then the tilt angle could be increased to form a ridge at the abutment between flat and curved bed portions. The amount the tilt angle can be increased will depend upon the deformation characteristics of the glass as it passes from the flat portion to the curved portion. The increase in the tilt angle, over what it would be if the curved portion were tangent to the flat portion at the abutment therebetween, will be small if the glass resists deformation to a great extent since in such a situation the glass sheet would move over the curved bed portion in a cantilever fashion so that its leading edge is increasingly farther away from the curved bed surface as the sheet moves thereon from the flat portion. The leading edge of the sheet would then not be supported on the blanket of gases to the same extent the middle of the sheet is supported. Therefore, as the middle of a sheet of glass is over the abutment between the flat portion and the curved portion, both the leading edge, which is over the curved portion, and the trailing edge, which is over the flat portion, will be farther from the respective bed surfaces than the middle of the sheet. In such a disposition, the middle of the sheet of glass approaches the ridge along the abutment between the two portions and, in fact, may contact the ridge to mar and injure the glass. To prevent the glass sheet from contacting the bed at the abutment between the flat portion and the curved portion, the curved portion is disposed tangent with the flat portion at the abutment, or, when the curved portion is not tangent to the flat portion, the ridge caused thereby must not be sufficient to cause such contact.

An alternative embodiment is shown in FIGURE 4, wherein a transitional bed portion is disposed between the flat bed portion and the curved bed portion. The transitional bed portion abuts the flat bed portion at 225 and abuts the curved bed portion at 226 and has a degree of curvature which gradually increases from the abutment 225 to the abutment 226. The use of such a transitional bed portion having a gradually increasing degree of curvature alleviates the problems discussed above concerning a ridge at the abutment 26 between the flat and curved bed portions when the flat portion is not tangent to the curved portion at the abutment.

FIGURE 5 shows an L-shaped bed in cross-section where the flat portion slopes upward to the abutment 26 with the tilted curved portion of the bed. A further disposition of the bed of the furnace is illustrated in FIGURE 6 wherein the flat portion of the bed slopes downward to the abutment 26 with the curved portion of the bed. As alluded to previously, the same limitations as are applicable to the angle of the longitudinal axis of the flat portion of the bed with the horizontal, which are applicable as the limiting angles for the angle of tilt of the curved portion of the bed 27. More particularly, since the limitations of the angle of degree of tilt of the curved portion of the bed 27 is approximately twelve degrees, the limitations for the angle with which the flat longitudinal axis of the flat portion of the bed forms with the horizontal is also limited to approximately twelve degrees. This is true since, if the glass being conveyed along the curved portion of the bed 27 would distort when tilted at an angle of greater than twelve degrees so as to deform or injure the edges of the sheet, it will also deform if the longitudinal axis of the flat portion of the bed is at an angle greater than twelve degrees with the horizontal. In such a disposition, either the leading edge, in bed positioning of FIGURE 6, or trailing edge, in the bed positioning of FIGURE 5, of the sheet of glass will also be deformed or injured due to the sheet of glass acting against the conveyor 31 which contacts the sheet of glass at the leading edge in a furnace using the bed of FIGURE 6 and the trailing edge in a furnace using the bed of FIGURE 5.

It will, therefore, be understood that in the various embodiments illustrated the curved portion of the bed is curved about an axis which is parallel to the abutment between the curved portion and the flat portion of the bed. In the embodiments of FIGURES 4 and 5 the curved portion of the bed includes a transition section having a gradually increasing degree of transverse curvature as well as a section having a cylindrical curvature; however, both sections are curved relative to or about an axis or a series of axes, i.e., it may be said that the transition and the cylindrical curved sections are curved about the pre-longitudinal axis of the curved portion of the bed. Thus, when it is stated that the curved portion of the bed is curved about an axis this does not mean that the curved portion of the bed must be cylindrical but in fact may include a section which gradually increases or decreases in degree of curvature in a direction away from the abutment therebetween. In all of the embodiments illustrated the curved portion of the bed has a constant degree of curvature along an axis which is parallel to the abutment between the flat portion and the curved portion, such an axis may be the longitudinal axis of the curved portion of the bed. Furthermore, it will be clear that the curved portion of the bed curves in a direction generally away from the abutment with the flat portion of the bed. Said another way the curved portion of the bed is curved in a direction which is transverse to the abutment between the flat bed portion and the curved bed portion.

*Conveyor system*

As has been previously pointed out, the curved bed portion 27, which is disposed in the transverse leg of the L-shaped furnace, is tilted at an angle to the horizontal plane of the furnace. With the glass sheet 33 floating on a blanket of gases above the curved portion 27 of the bed and the blanket of gases being of substantially constant thickness, it is obvious that the glass will have a component of force due to weight directed along the chord of the curved surface of the bed portion 27. Due to this angularity and this component of force, it is possible to provide a conveyor system along the curved portion of the bed 27 which will transport the glass sheets along the length of the support bed portion 27 with very light contact with the glass sheets 33. As the glass sheets 33 float on a blanket of hot gases over the flat portion of the bed, very little force is necessary to transport, or convey, or push the glass sheets along the bed, and thus very light contact in the direction of travel is all that is necessary to move the sheets. Since there is no component of force urging the edge of the glass sheets 33 to one side or the other of the flat portion of the bed, in contradistinction to the situation along the curved portion 27 of the bed, the conveyor 31 utilized to move the glass sheets 33 along the flat portion of the bed must push the sheets by pressing against the trailing edge thereof. Furthermore, when the glass sheets 33 reach the abutment 26 between the flat portion of the bed and the curved portion 27 of the bed, the sheets go downhill, so to speak, in that gravity urges the sheet to accelerate as it passes over the curved portion of the bed. Due to this acceleration, the conveyor moving the sheets along bed portion 33 must also provide a braking means so that the glass sheets 33 will not accelerate as they pass over the curved portion of the bed 27 and abut against the conveyor 32 for the curved portion of the bed with sufficient force to deform and injure their edges.

FIGURE 7 is a plan view of the bed of the furnace showing glass sheets 33 moving along the flat portion of the bed to the curved portion of the bed where they are then moved at right angles to the flat portion of the bed. A conveyor track and chain is shown generally at 31 over the middle portion of the flat section of the bed. Another similar chain and track is generally shown at 32 along the curved portion 27 of the bed. The type chain used for conveyor sections 31 and 32 is shown in FIGURE 17 wherein there is shown a chain having links 103 and 104. At given intervals along the chain, depending upon the forces acting upon the chain, the link 104 is replaced by the link 104' which has plates extending downwardly along either side of the track 105 over which the chain rides.

FIGURE 18 is a cross-sectional view of the chain illustrated in FIGURE 17 and shows a rod 106 extending from the chain, and in fact, such rod 106 is an extension of a connecting bar for adjacent links 103 and 104'. The extended bar 106 is inserted into the chain at predetermined positions along the chains and is utilized to be connected to the pads which move the glass sheets 33 along the flat and curved portions respectively of the bed. The bar 106 has different shaped ends depending upon which conveyor it is in, and if in conveyor 31 to which pad it is connected.

The pads 112 are suspended from the conveyor 31 and engage the trailing edge of the respective glass sheets 33 to move the glass sheets along and over the flat portion of the bed. The sheets 33 move along the flat portion of the bed and reach the abutment 26 of the flat portion of the bed with the curved portion 27 of the bed, and after passing over the curved portion of the bed, they engage the pads 113 of the conveyor 32 which moves the respective sheets along the curved portion 27 of the bed. The pad 111, at the leading edge of the sheets 33, controls the movement of the respective glass sheets 33 as they move initially over the curved surface 27 toward engagement with the pads 113 so that they will not accelerate and abruptly engage the pads 113. However, it is evident once the glass sheets 33 engage the pads 113 of the conveyor 32, the pads 112 engaging the trailing edges must disengage. In order to accomplish this, the pad 112 is connected to a rod 114, more clearly shown in FIGURE 8, which passes through an aperture in the bar 106 and extends upward to connect with a slider bar 115. The bar or rod 114 is free to move up and down within the aperture in the bar 106; however, its downward movement, and therefore its distance above the flat portion of the bed, is limited by a pin 116, which strikes the bar 106. It is apparent that the pad 112 must be maintained transverse the flat portion of the bed and rigid in the vertical plane; therefore, the sliding connection between the rod 114 in the bar 106 is grooved or splined so that the rod 114 cannot rotate within the bar 106. Also, the bar 106 is brazed to one of the links 103 or 104 of the chain, or secured to one of the links in some other appropriate manner such as welding.

As shown in FIGURES 7, 8 and 9, a guide track 121 is suspended adjacent the conveyor 31. The bar 115 engages the guide 121 when the pad 112 approximately reaches the abutment 26 between the flat and curved portions of the bed to raise the pad member 112 thereby to disengage the pad 112 from the trailing edge of the glass sheet 33. The bar 115 travels the length of the guide 121 to keep the bed 112 above the glass sheet 33 as the sheet begins its movement along the longitudinal axis of the curved portion 27 of the bed.

FIGURE 17 is an enlarged sectional view more clearly showing the conveyor 32. The conveyor 32, as discussed above, differs from the conveyor 31 in that it is disposed along the side of the curved portion of the bed 27 instead of above and along the middle thereof as is the conveyor 31 with respect to the flat bed portion. The pads 113, which engage the curved glass sheets, move longitudinally along the curved portion 27 of the bed and are maintained in place by a bent or curved rod 117, which engages the bar 106. The bar 106, in the conveyor 32, is secured to one of the links so that it cannot rotate, and in a similar manner bar 117 is rigidly secured to the bar 106 so it cannot move relative to the bar 106.

As is apparent in FIGURES 7 and 8, the pads 111 and 113 pass through a common intersection at the lower edge of the curved portion 27 of the bed. It is, therefore, necessary to synchronize the movement of the conveyors 31 and 32 so that the pads 111 disengage from the leading edge of the glass sheets 33 as the glass sheet engages pads 113, one on either side of the point where pad 111 disengages the sheet. The synchronization is accomplished by gearing. As illustrated in FIGURE 8, the chain of the conveyor 31 forms a continuous loop. Likewise, the chain of conveyor 32 forms a continuous loop. The chain of the conveyor 31 leaves the track 105 and passes to a chain engaging gear 131 over which it passes to the other end of the track 105 above the middle of the flat portion of the bed. Likewise, the chain of the conveyor 32 passes over gear 132. Gears 131 and 132 are connected by a simple gearing system so that the conveyor 31 moves the glass sheets 33 over the flat portion of the bed at the same speed that the conveyor 32 moves the curved glass sheets 33 over the curved portion 27 of the bed. The gears 131 and 132 rotate at the same speed due to their connection to respective bevel gears 133 and 134. Due to the connection of gears 131 and 132 in this manner, the chains of the conveyors 31 and 32 are moved along their respective tracks at the same speed. Furthermore, the appropriate drive means, such as an electric motor, may be attached to any one of the gears to drive the chains of the respective conveyors 31 and 32. Other particular features of the chain used in a furnace of the instant invention are described in detail and claimed in United States Patent 3,282,447 in the name of Harold A. McMaster and assigned to the assignee of the present invention.

The conveyor system illustrated herein moves the glass sheets through the furnace and is extremely simple in construction and operation and affords little contact with the glass sheets to avoid problems of seriously injuring or deforming the sheets. It is to be understood, however, that it is within the capability of one skilled in the art to utilize many variations of conveying systems to move the glass sheets 33 over the flat portion of the bed 27 and over the curved portion 27 of the bed, and, therefore, the conveying system shown is merely illustrative of one embodiment.

As is apparent from the foregoing description, the present invention provides a unique furnace which utilizes an L-shaped bed to efficiently curve the glass sheets to a desired radius of curvature.

The invention has been described in an illustrative manner and it is to be understood that the terminology which has been used herein is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

I claim:

1. In an apparatus for treating sheets of material including means for at least partially supporting the sheet on gases over a gas support bed and means for heating the sheet and means for moving the sheet thereover, the improvement comprising: a gas support bed having first and second portions abutting each other along respective sides thereof, said first portion of said bed having a flat upper surface, and said second portion of said bed having a curved upper surface which curves in a direction laterally away from the abutment between said first and second portions and which has a constant degree of curvature along an axis which is parallel to the abutment between said first and second portions, said second portion being elongated so that serially arranged spaced sheets of material may be moved in a first direction over said first portion and subsequently moved over said second portion in a second direction which is parallel to said abutment.

2. In an apparatus for treating sheets of material including means for at least partially supporting the sheet on gases over a gas support bed and means for heating the sheet and means for moving the sheet thereover, the improvement comprising: a furnace; a gas support bed having a first elongated portion and a second elongated portion both of which are supported within said furnace; said first portion having a flat surface; said second portion being disposed in abutting relationship with said first portion along at least a portion thereof; and said second portion having an upper surface curved about an axis extending longitudinally thereof and which axis is parallel to the abutment between said first and second portions; the degree of curvature transverse to said axis being constant along said axis and extending in a direction generally away from the abutment between the first and second portions.

3. An apparatus as set forth in claim 2 wherein said surface of said curved portion is tangent to the plane of said flat portion at the abutment therebetween.

4. An apparatus as set forth in claim 2 wherein said curved second portion includes: a gradually curved section, and a cylindrically curved section, said gradually curved section of said second portion being disposed in abutting relationship with said flat portion and curving in a direction away from the abutment with said flat portion, and said cylindrically curved section being disposed in abutting relationship with said gradually curved section so that, as a sheet of material is moved from said flat portion over said gradually curved section and said cylindrically curved section, it gradually curves and then finally curves in conformance with the cylindrical curvature of said cylindrically curved section.

5. An apparatus as set forth in claim 2 wherein the plane of said flat bed portion is a horizontal plane.

6. An apparatus as set forth in claim 2 wherein the plane of said flat bed portion is disposed at an angle with a horizontal plane.

7. An apparatus as set forth in claim 2 wherein the upper surface of said curved portion is tangent to the flat upper surface of said flat portion at the abutment therebetween.

8. An apparatus as set forth in claim 2 wherein said curved bed portion is curved about an axis which is disposed at a horizontal angle of 90° with respect to the longitudinal axis of said elongated flat portion of said bed.

9. An apparatus as set forth in claim 2 wherein said curved portion of said bed extends in a direction perpendicular to the longitudinal axis of said flat portion to allow a sheet of glass to move in a first direction along said flat portion of said bed and on to and over said curved portion of said bed and then to move in a second direction perpendicular to said first direction along said curved portion of said bed.

10. A method of curving sheets of glass comprising: supporting the sheet on gas, heating the sheet to a temperature at which the sheet is soft, conveying the sheet in a first direction over a flat gas support bed, curving the moving sheet about an axis which extends in a transverse direction relative to said first direction, conveying the curved sheet in said transverse direction while maintaining the curvature thereof constant, and cooling the curved sheet.

11. A method of curving sheets of glass comprising: supporting the sheet on gas, heating the sheet to a temperature at which the sheet is soft, conveying the sheet in a first direction over a flat gas support bed, conveying the sheet over a curved bed which abuts said flat bed and is curved about an axis parallel to the abutment for curving the sheet, conveying the curved sheet along the curved bed in a direction parallel to said axis, and cooling the curved sheet.

References Cited

UNITED STATES PATENTS 3,223,501  12/1965  Fredley et al. _____ 65—25
3,291,590  12/1966  McMaster _____ 65—25

S. LEON BASHORE, *Acting Primary Examiner.*

DONALL H. SYLVESTER, *Examiner.*

A. D. KELLOGG, *Assistant Examiner.*